Sept. 15, 1953  J. H. WILSON  2,651,947
MULTIPLE ENGINE COUPLING
Filed May 24, 1949  4 Sheets-Sheet 1

INVENTOR.
John Hart Wilson
BY
Wayland D. Keith
His Agent

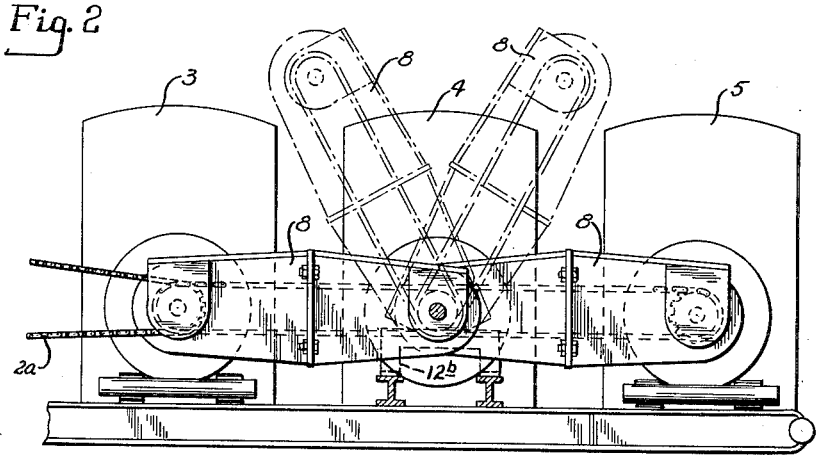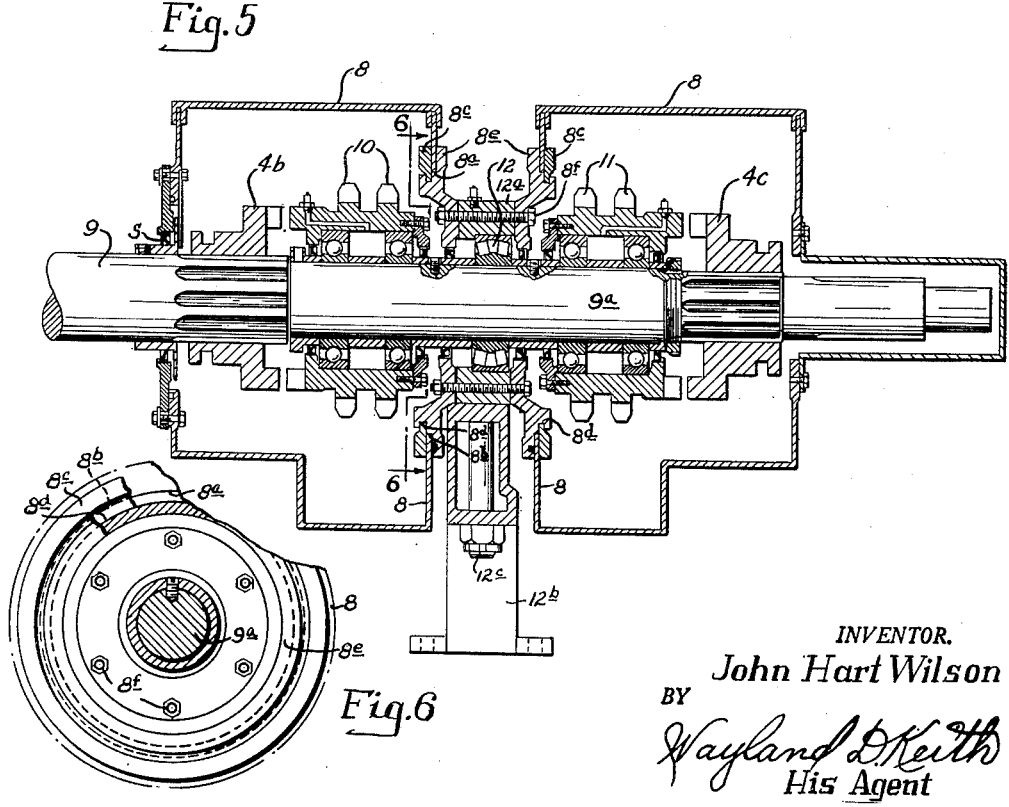

Sept. 15, 1953   J. H. WILSON   2,651,947
MULTIPLE ENGINE COUPLING
Filed May 24, 1949   4 Sheets-Sheet 3
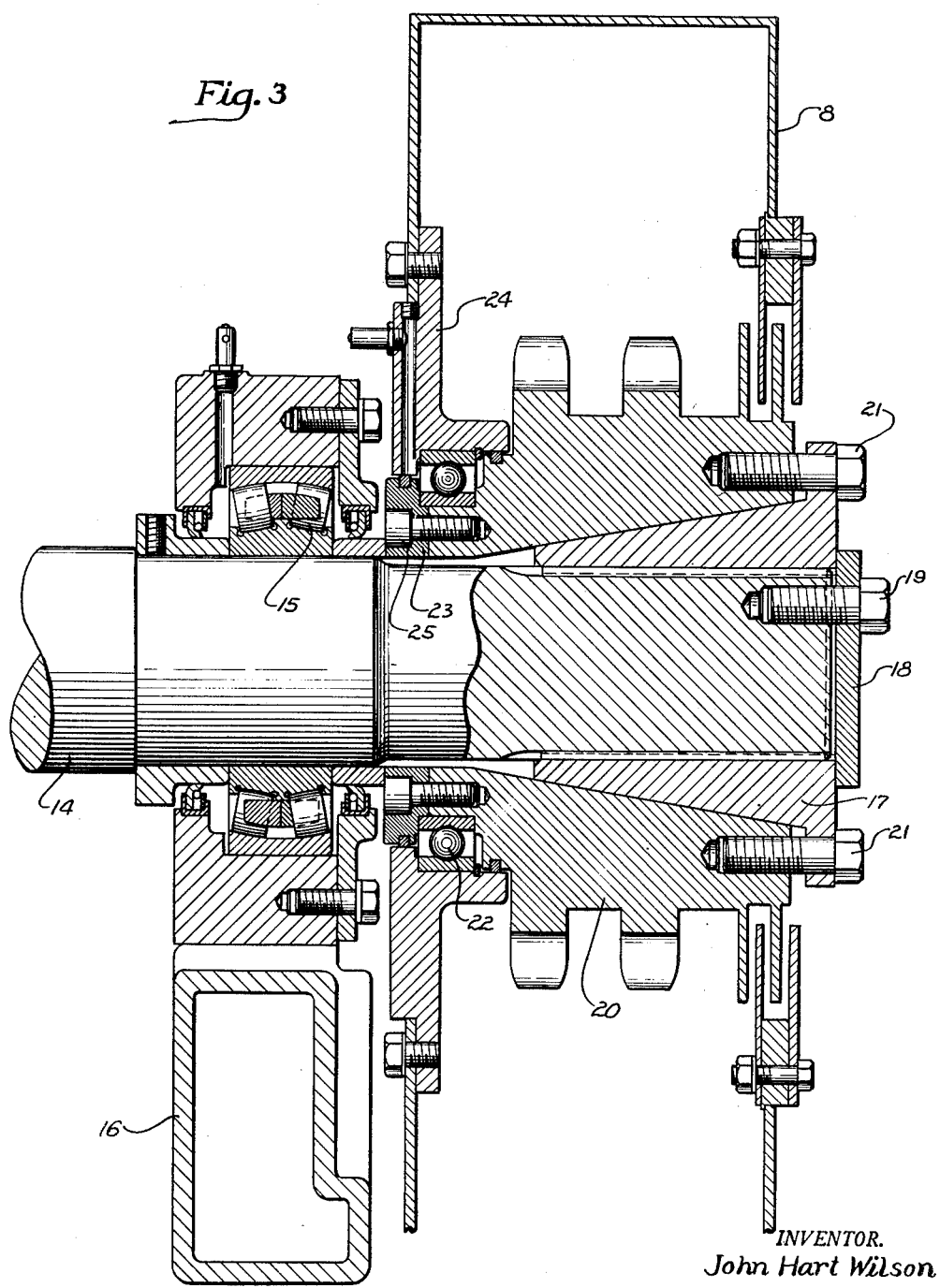
INVENTOR.
John Hart Wilson
BY
Wayland D. Keith
His Agent

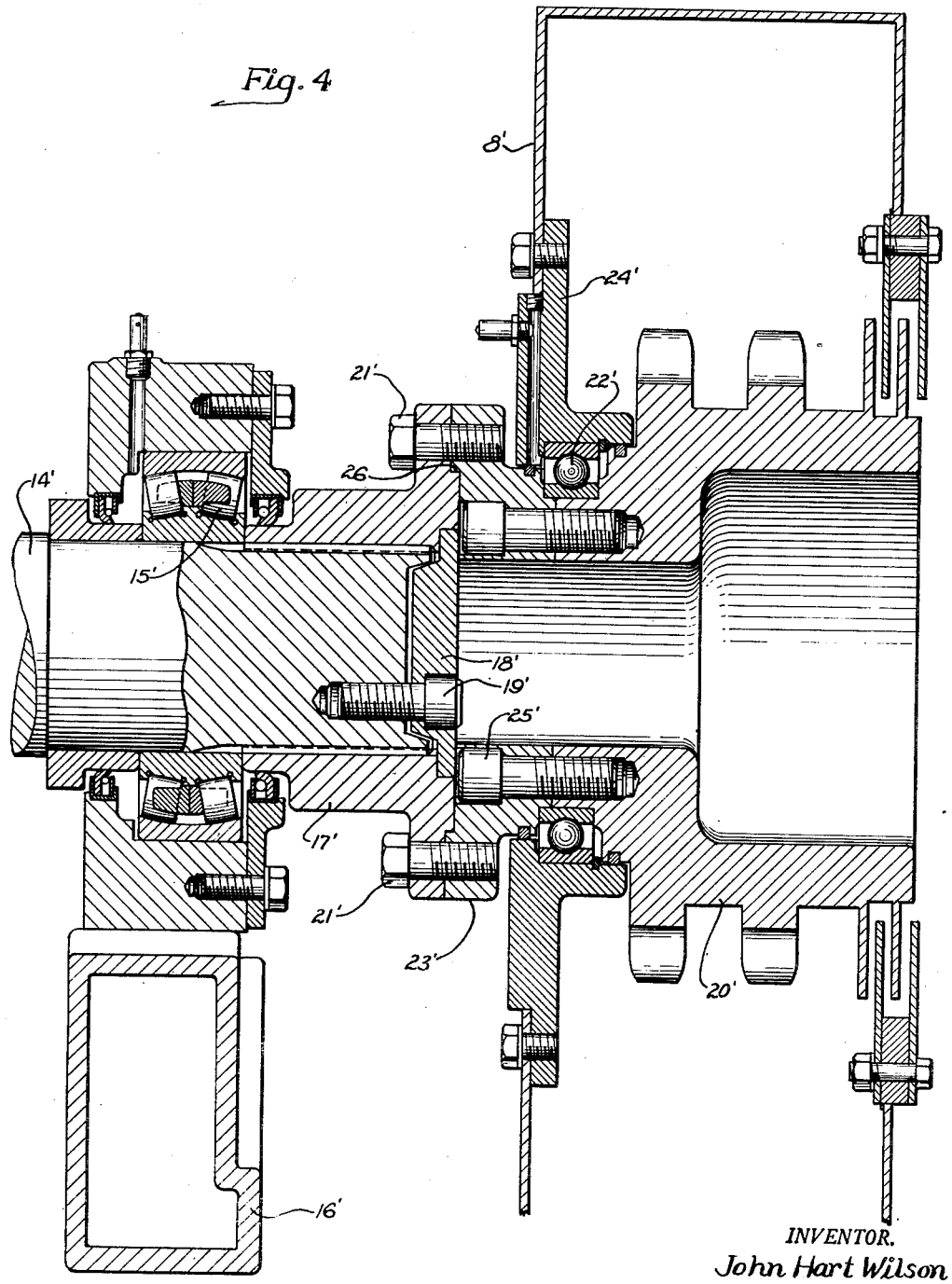

Patented Sept. 15, 1953

2,651,947

UNITED STATES PATENT OFFICE 2,651,947

MULTIPLE ENGINE COUPLING

John Hart Wilson, Wichita Falls, Tex.

Application May 24, 1949, Serial No. 94,953

5 Claims. (Cl. 74—722)

1

This invention relates to improvements in multiple engine couplings of the character adapted to couple together a plurality of engines by means of endless flexible devices, such as sprocket chains which extend therebetween, so that the engines will operate as a unit.

It has been customary, heretofore, to use two, three, or more engines connected together for joint operation, and in order to do this, the drive shafts of the engines were connected together through sprocket chains, which sprocket chains extended from one engine to another so as to operate in tandem relation. When a multiplicity of such engines are used, especially in oil well drilling, it is frequently necessary to move the engines, that is, whenever it is necessary to move the rig, the engines must also be moved. Oil field rigs are comparatively heavy, and are difficult to handle as a unit, therefore, it has been customary heretofore, to detach the sprocket chains from the respective engine drive shafts so that the engines might be removed and handled individually. The removal of the engines made it necessary for the sprocket chains to be reconnected when the engines were reassembled. Moving the engines necessitated the removal of the chain guards in order to disconnect the chains so that they might be moved. Such chains are quite heavy, so they must be replaced and reconnected individually, then the chain guards replaced, all of which required laborious and time consuming work, and delay in getting the rig in operation on a new location.

The invention, together with a modification thereof, is shown as applied to a rotary drilling rig, but it is to be understood that it is applicable for driving connection for driving any mechanism wherein it is necessary to disassemble the mechansm for moving or to disconnect the driving member from the driven member, and still maintain the interconnecting drive member, such as a chain or belt in taut driving relation so as to enable ready assembly and disassembly thereof.

When chains are used as the interconnecting drive member between the driving member and the driven member, they remain attached to the sprockets on which they are mounted and these may be maintained in spaced connected relation and the sprockets may be disconnected from the adjacent engine and swung about the shaft of the engine, without the necessity for disconnecting the chains for moving the individual engine. After the engines are moved as desired, the sprockets may be reconnected with the

2 drive shafts of the respective engines easily and quickly.

The primary object of this invention is to provide connection means between engines that are used as a unit, whereby the connection may be maintained in taut relation when the engines are disconnected, and which may be readily reconnected to the drive shafts of the engines for reconnection of the respective engines.

Another object of this invention is to provide interconnecting drive members for multiple engines which are adapted to remain connected to one of the engines and to be readily disconnected from the adjacent engines to enable the separation and removal of the respective engines, yet maintaining the drive members in taut relation for reconnection to the adjacent engines when relocated.

Another object of this invention is to improve the construction of the connection between engines, whereby the connections may be maintained in connected, taut condition, for simple and easy attachment to the drive shafts of the respective engines without the necessity for disconnecting the driving members that extend between the drive shafts of the engines.

The objects of this invention may be accomplished by providing a detachable connection between the drive sprockets and the connecting shafts to enable the sprockets to be disconnected therefrom when it is desired to move the engine, and journaling the sprocket in the chain guard provided, so as to enable the sprockets and the sprocket chain to remain in assembled relation in the guard during the moving of the engines without the necessity of disconnecting the chains for this purpose.

An embodiment of this invention is illustrated in the accompanying drawing in which:

Fig. 2 is an end elevational view thereof showing the manner of detachably connecting the chain guards in place;

Fig. 3 is a longitudinal sectional view through one form of the sprocket assembly in accordance with this invention;

Fig. 4 is a view similar to Fig. 3, but illustrating a modification of the invention;

Fig. 5 is a sectional view through an intermediate drive sprocket assembly; and

Fig. 6 is a fragmentary sectional view taken on the line 6—6 of Fig. 5, with parts broken away and with parts shown in elevation to bring out the details of construction.

Figure 1:
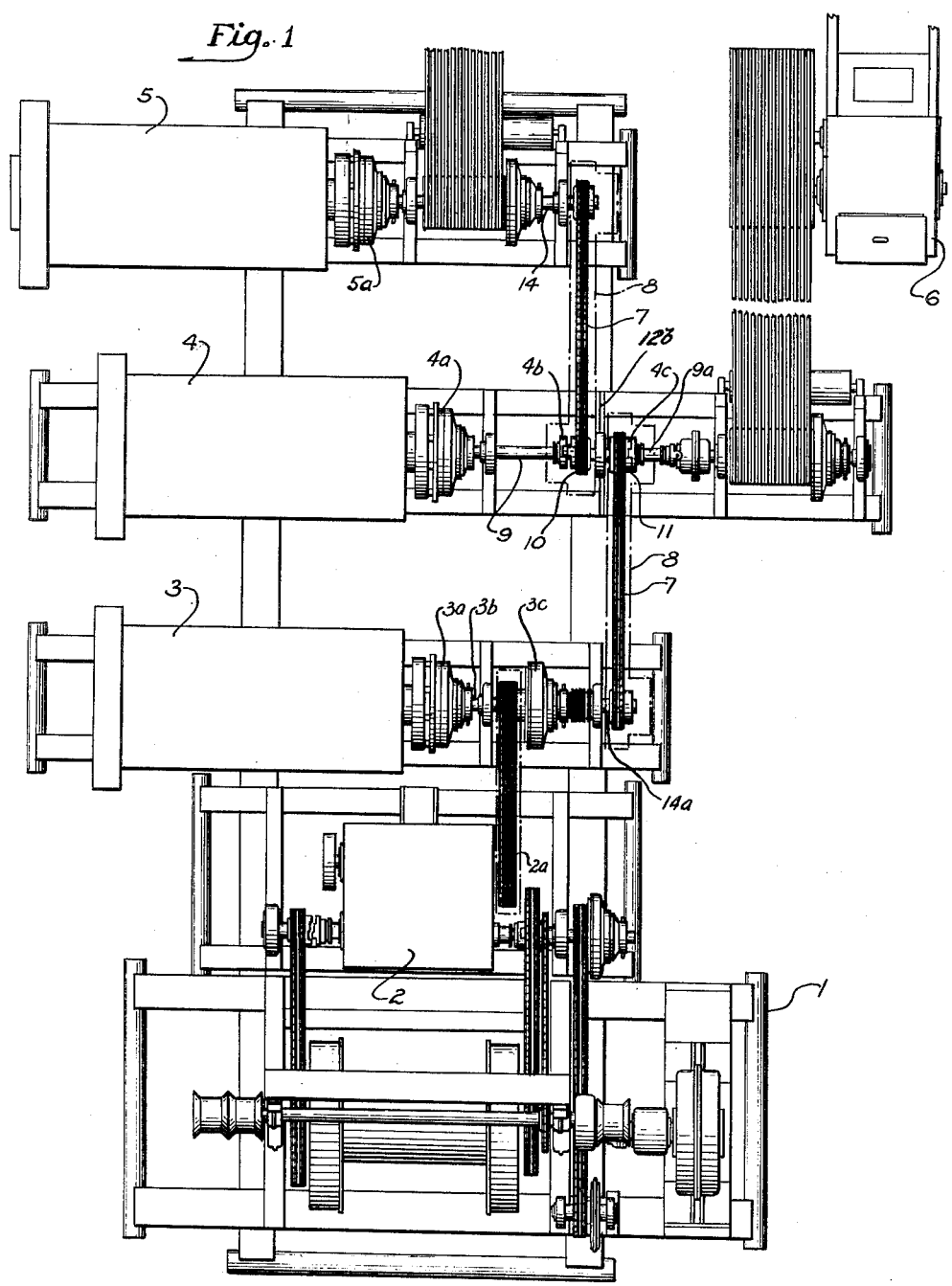
Fig. 1 is a top plan view of a multiple engine assembly showing the invention as applied thereto.

The invention, together with a modification thereof, is illustrated as applied to a rotary drilling rig, the draw works of which is designated by the numeral 1, which draw works is driven from a transmission 2 that is operated by an engine unit comprising a multiplicity of engines. Three such engines are illustrated and designated as 3, 4 and 5, respectively. The transmission 2 carries the usual clutch for engaging and disengaging the rotary draw works 1, and is driven by a drive chain 2a which is adapted to encircle the driving sprocket on one of the engines and the driven sprocket of the transmission. The engines 3, 4 and 5 are shown to have friction clutches 3a, 4a, and 5a respectively for connection with the respective driven shafts thereof.

The drive shaft 3b of engine 3 has a clutch 3c mounted thereon to interconnect drive shafts 3b and 14a to make possible multiple power connections for engines 4 and 5 through interconnecting chains, as will be more fully described hereinafter.

One of the engines 3, 4, or 5 may drive either the draw works 1, or the mud pump 6, according to the arrangement of the sprocket chain connections and clutches. Or, any engine may be coupled in tandem with the other engines so that the entire power of the multiple engine unit may be directed for driving the draw works 1 and the drilling rig, or the mud pump 6, or the entire multiple engine unit may be connected to these two units simultaneously, or the engines 4 and 5 may be utilized for driving one or more pumps, and the engine 3 may operate as an independent unit for driving the draw works and the other rotary drilling mechanism. The engine 4 is shown as having two sets of jaw clutches, generally designated 4b and 4c, the slidable parts of which are splined or keyed to the respective shafts 9 and 9a. Chain guards 8 and 8 are journaled on the shafts 9 and 9a, respectively.

In the form of the invention illustrated, the driving connections from the engine 3 to the engine 4 and from the engine 4 to the engine 5 is through sprocket chains 7, which extend through chain guards 8. The engine 4 has a main drive shaft 9 with the sprockets 10 and 11 journaled thereon, as shown in Fig. 5; and over which sprocket chains 7 are adapted to pass. The chain guards 8 are mounted on bearings 12 surrounding the shaft 9, as shown in Fig. 5. The chain guards 8 are capable of swinging movement from their aligned positions between the engines, as shown in full lines in Fig. 2, to the position shown in dotted lines in Fig. 2, which shows the chain guards 8 as swung upward.

Each of the engines 3 and 5 have drive shafts 14a and 14 connected therewith respectively, which drive shafts each are adapted for driving connection with the sprocket chain 7 through a sprocket wheel assembly, one form of which is illustrated in Fig. 3, and another form thereof is shown in Fig. 4. Either of these forms of sprocket wheel assembly may be used as desired.

With reference to the form of the invention as illustrated in Fig. 3, the outer end of the drive shaft 14 is journaled in a bearing 15, which bearing is mounted on a cross bar 16, which bar 16 is supported on the skids of the engine. The projecting end of the shaft 14 has keyed thereto a splined tapered bushing 17, which bushing is held in place by a plate 18 and a screw 19 that engages in the extreme end of the shaft 14. The bushing 17 supports thereon a drive sprocket 20 which centers about the shaft 14. The drive sprocket 20 is secured to the bushing 17 by means of bolts 21, as shown in Fig. 3.

The side of the sprocket 20 opposite the bushing 17 is mounted on anti-friction bearings 22, which bearings are held in place by a lock ring 23, which lock ring 23 is secured to sprocket 20 by bolts 25. The anti-friction bearings 22 are mounted within a bearing support 24, which bearing support is secured to one side of the chain guard adjacent the outer end thereof.

While the engines are assembled in operating relation, the sprocket 20 is secured directly upon the shaft 14 by the bushing 17, whereby the anti-friction bearings 22 support only the outer end of the chain guard 8, and allow freedom of rotation of the sprocket with respect thereto. The bearings 15 are then supporting the projecting end of the shaft.

When it is desired to disassemble the engines and move these to a new location, it is necessary merely to remove the bolts 21 and 19 and to slip the bushing 17 off the end of the shaft 14. After the engine is thus withdrawn from its driving connection with the sprockets 20, it is moved back through the length of the sprocket, after which the engines may be handled and moved individually apart from the sprocket assembly. The sprocket 20 is then supported on the bearings 22 in the chain guard 8, and remains connected with the drive shaft 9 of the engine 4, being handled therewith, in moving the respective engines.

The two chain guards 8 may each be turned from the positions shown in full outline to those shown in the dotted lines in Fig. 2, during the transportation of the engine 4.

The chain guards 8 each have circular holes 8a therein, the bore of which holes is adapted to fit on a circular shoulder 8b so that the respective chain guards 8 will move relative thereto. An annular retaining lock ring 8c fits within a circular groove 8d which is formed within circular bracket 8e which bracket has an outstanding portion of approximately the same outer diameter as the ring 8c, so as to define a space between the annular retaining lock ring 8c and the bracket 8e to confine the chain guard 8 therebetween for relative arcuate movement with respect to said retaining lock ring 8c and bracket 8e. The brackets 8e are bolted by means of bolts 8f to bearing housing 12a, which housing is bolted to a bearing support bracket 12b by means of bolts 12c. The bearing support bracket 12b is secured to the sill of engine No. 4, as will best be seen in Figs. 1 and 2. Since the bearing housing 12a is secured integral with the bearing support bracket 12b, this is retained against movement when the chain guards 8 are moved through an arcuate movement about the shoulders 8b on the respective brackets 8e. The shaft 9a rotates within anti-friction bearing 12 with the housing 12a remaining stationary, therefore the chain guards 8 may each be moved through an arcuate movement with respect to the brackets 8e without being affected by the rotary movement of the shaft 9a. The chain guards 8 may be moved into position as shown in dot-dash outline, when coupling units 17—21 or 21'—23 have been removed from the respective engines 3 and 5. As shown in Fig. 5, the outer side of the left hand chain guard 8, has a friction seal S which enables relative rotation between the shaft 9 and the chain guard which offers no material friction, but which retains the oil within the inner confines of the chain guard 8.

After the engines have been moved to a new location, these may be recoupled and reassembled, substantially in the manner shown in Fig. 1. The chain guards 8 are turned down to their full-line positions in Fig. 2, and the sprockets 20 moved into alignment with the respective shafts 14 of the engines 3 and 5. Then the drive bushing 17 is inserted into the sprocket 20 and secured in place by the bolts 21 and the plate 18, to couple the sprocket with the shaft 14, after which, the engine is ready for renewed operation.

Another form of driving connection is shown in Fig. 4, which may be used alternately with that shown in Fig. 3, and either of these forms of driving connection may be employed for the driving connection with the drive shaft of either of the engines 3 or 5. The form as shown in Fig. 4, will also provide a detachable driving connection between the engine shaft and the sprocket wheel.

With reference to Fig. 4, the engine drive shaft is designated generally at 14', and has its outer end mounted in anti-friction bearings 15', in a cross frame member 16', which anti-friction bearings 15' support the projecting end of the shaft in the normal operation of the engine.

The sprocket is designated generally at 20' and is mounted at one side thereof in anti-friction bearings 22' supported by a bearing support 24' within chain guard 8'. The anti-friction bearings 22' are confined by a bearing ring 23' and bolts 25' which secure the bearing ring to the end of the sprocket 20'.

The sprocket 20' is spaced outwardly from the projecting end of the shaft 14' and is connected therewith by a flanged hub 17' keyed or splined to the end of the shaft and held in place thereon by an end plate 18' and a bolt 19', which bolt 19' extends through the plate 18' and is threaded into the end of the shaft 14'. The flanged hub 17' is secured by bolts 21' to the ring 23' and is connected thereby with the sprocket 20'. The flanged hub 17' is aligned with the ring 23' by a shoulder 26.

In order to detach the sprocket from the shaft, in this form of the invention, it is necessary merely to remove the bolts 21' from their connection with the drive flanged hub 17' and the ring 23', which will then make it possible for the engine to be drawn back away from the sprocket and the chain guard 8'. This distance need be only sufficient to disengage the shoulder 26 from between the flanged hub 17' and the ring 23', after which the chain guard 8 may be moved upward to its dotted-line position, as shown in Fig. 2. This disconnects the sprocket and the chain 7 that extends thereover, from the drive shaft 14', and allows the engine to be removed from the assembly substantially as described above.

The construction, as described, makes it possible to disconnect the chains and chain sprockets from the drive shafts of the engines for separate removal and transportation of the latter without the necessity for disconnecting the chains themselves. Furthermore, an appreciable amount of time is saved, that would otherwise be used for reconnecting the engines. The sprockets can now be connected with the drive shafts in very little time when the engines are positioned on a new location.

While the invention has been illustrated as applied to well drilling rigs, it is to be understood that it is not limited to this application, because there are many occasions, in chain drive connections, where it is desirable to maintain a chain in stretched condition while the connected parts are removed and replaced, such as power plants and the like, and this is made possible according to the present invention. Neither is the invention limited to its use in sprocket chains, but may be applied to other connections such as V-belts and other endless driving mechanism that require occasional removal and replacement.

Having thus described the invention, I claim:

1. The combination of at least two power plants each having a drive shaft extending therefrom, the first of said power plants having at least one gear journaled on the drive shaft thereof, clutch means for selectively engaging said drive shaft and said gear in driving relation, the other of said power plants having a gear attachably secured to the drive shaft thereof for rotation therewith, an endless flexible transmission device surrounding said gears and in driving relation therewith, an elongated member interposed between said shafts and journaled with respect to the respective axes of said shafts so as to maintain said gears a spaced distance apart so when said gear of said last mentioned power plant is detached from its drive shaft, said last mentioned gear, said endless flexible transmission device, and said elongated member interposed between said drive shafts may be pivotally moved around the axis of said drive shaft of said first mentioned power plant and be maintained in the same spaced relation for reattachment with said drive shaft of said last mentioned power plant.

2. The combination of at least two engines each having a drive shaft extending therefrom, the first of said engines having at least one sprocket journaled on the drive shaft thereof, clutch means for selectively engaging said drive shaft and said sprocket in driving relation, the other of said engines having a sprocket attachably secured to the drive shaft thereof for rotation therewith, an endless chain surrounding said sprockets in driving relation, therewith, an elongated member interposed between said shafts and journaled with respect to the respective axes thereof so as to maintain said sprockets a spaced distance apart so when said sprocket of said last mentioned engine is detached from its drive shaft, said last mentioned sprocket, said endless chain, and said elongated member interposed between said drive shafts may be pivotally moved about the axis of said drive shaft of said first mentioned engine and be maintained in the same spaced relation for reattachment with the said drive shaft of said last mentioned engine.

3. The combination of at least three power plants arranged in side by side aligned relation and each having a drive shaft extending therefrom in side by side aligned relation, the center power plant of said power plants having at least two gears journaled on the drive shaft thereof, a clutch means for selectively engaging each of said gears with said drive shaft in driving relation, the other of said power plants each having a gear attachably secured to the respective drive shafts thereof for rotation therewith, a pair of endless flexible transmission devices, one of which surrounds one of said gears on the drive shaft of said center engine and said gear on the said drive shaft of another of said power plants, the other of said endless flexible transmission devices surrounding the other of said gears on said drive shaft of said center power plant and the gear on said drive shaft of still another of said power plants, an elongated guard member surrounding each of the respective pairs of said gears and said endless transmission device surrounding said pairs of gears, which guard member journals one of each pair of said gears so when said gears on said power plants on each side of said center power plant are detached from their respective shafts, said last mentioned gear, said endless flexible transmission device and said elongated guard member for the respective power plant positioned on each side of said center power plant may be pivotally moved around the axis of said drive shaft of said center power plant and be maintained in the same lateral spaced relation for reattachment of said gears to their respective drive shafts of said power plants.

4. The combination with at least three engines arranged in side by side relation and each having a drive shaft extending therefrom in side by side aligned relation, the center engine of said engines having at least two sprockets journaled on the drive shaft thereof, a clutch means for selectively engaging each of said sprockets with said drive shaft in driving relation, the other of said engines each having a sprocket attachably secured by bolt means to the respective drive shafts for rotation therewith, a pair of endless chains, one of which surrounds one of said sprockets on said drive shaft of said center engine and said sprocket on said drive shaft of another of said engines, the other of said endless chains surrounding the other of said sprockets on said drive shaft of said center engine and the sprocket on said drive shaft of still another of said engines, an elongated guard member surrounding each of said pairs of sprockets and each guard member journaling one of said pair of sprockets therein so as to maintain said sprockets of said pairs a spaced distance apart, so when each of said sprockets on each of said drive shafts on said respective engines on each side of said center engine are detached from their respective drive shafts, said sprocket, said endless chain and said chain guard of each of said engines on each side of said center engine may be pivotally moved about the axis of said drive shaft of said center engine and be maintained in the same lateral spaced relation for reattachment of the respective sprockets to the respective drive shafts of said engines.

5. The combination of at least three engines arranged in side by side relation, each having a drive shaft extending therefrom in side by side aligned relation, the center engine of said engines having at least two sprockets journaled on the drive shaft thereof, a clutch means for selectively engaging each of said sprockets with said drive shaft in driving relation, the other of said engines each having a sprocket attachably secured by wedge means to the respective drive shafts for rotation therewith, an endless chain surrounding one of said sprockets on said drive shaft of said center engine and the sprocket on said drive shaft of the second of said engines, a second endless chain surrounding the other sprocket on said drive shaft of said center engine and the sprocket on said drive shaft of the third of said engines, a chain guard member surrounding each pair of sprockets and each guard member journaling one of said pair of sprockets therein so as to maintain said sprockets of said pairs a spaced distance apart so when said sprockets of the drive shafts of the second and third engines are detached from their respective drive shafts, said sprocket, said endless chain, and said chain guard of each of said engines may be pivotally moved about the axis of said drive shaft of said center engine and be maintained in the same lateral spaced relation for reattachment of the respective sprockets to the respective drive shafts of said engines.

JOHN HART WILSON.

References Cited in the file of this patent

UNITED STATES PATENTS

| Number | Name | Date |
|---|---|---|
| 1,906,478 | Maxwell | May 2, 1933 |
| 1,990,810 | Young | Feb. 12, 1935 |
| 2,355,272 | Cardwell | Aug. 8, 1944 |